United States Patent

[11] 3,588,235

[72] Inventors Nils B. Jacobson
　　　　　　　Solna;
　　　　　　　Jan R. Bolmgren, Sollentuna, Sweden
[21] Appl. No. 850,421
[22] Filed Aug. 15, 1969
[45] Patented June 28, 1971
[73] Assignee Medinova Aktiebolag
　　　　　　　Solna, Sweden
[32] Priority Sept. 3, 1968
[33] Sweden
[31] 11807/1968

[54] ARRANGEMENT FOR DETERMING THE REFRACTION OF THE HUMAN EYE
33 Claims, 12 Drawing Figs.

[52] U.S. Cl. .................................................... 351/19,
350/179, 350/180, 351/26
[51] Int. Cl. ......................................................... A61b 3/04,
G02b 1/06

[50] Field of Search ............................................. 351/19,
20—22, 26, 176; 350/179, 180

[56] References Cited
UNITED STATES PATENTS
2,300,251  10/1942  Flint ........................... 350/180
OTHER REFERENCES
Robt. Graham, " A Variable Focus Lens & Its Uses," JOSA, Vol. 30, Nov. 1940, pp. 560— 563 (350— 180)

Primary Examiner—David Schonberg
Assistant Examiner—Paul A. Sacher
Attorney—Larson, Taylor & Hinds ABSTRACT: An apparatus for measuring spherical refraction error and astigmatism. A combination lens system includes a spherical fluid lens and a cylindrical fluid lens, the two lenses being aligned for concurrent use. The dioptric value of each lens is varied by introducing and removing liquid therefrom by means of a bellows pump. Control devices control operation of the pump and the readings of the dioptric value of the lens can be combined or read separately.

ARRANGEMENT FOR DETERMING THE REFRACTION OF THE HUMAN EYE

In determining the refraction of the eye, one usually measures the optical properties of the eye by means of test lenses which the patient needs in order to gain maximum visual acuity. The data determined are essentially the dioptric value for the spherical correction needed, the angular direction of the axis about which astigmatism may exist, as well as the magnitude of such astigmatism, also measured in dioptric value of the cylindrical lenses needed.

There are several different kinds of equipment for determining the refraction of the eye, for instance such comprising a spectacle test frame in which fixed lenses may be introduced, and larger pieces of equipment containing the lenses needed, so-called refractors, through which the patient has to look.

Independently of the mentioned two kinds of equipment used, one has to place, successively, a number of different fixed lenses in front of the eyes, thereby trying to find the lens, or the combination of lenses, spherical and cylindrical, with which the patient himself is of the opinion that he has the best visual acuity. This procedure of successive trials is tedious, and further it suffers of the disadvantage that no continuous variation of the dioptric values of the lenses is possible, and this is of particular disadvantage, as shall be described below, when determining a combination of spherical and cylindrical lenses.

The present invention refers to a system for determining the refraction of the eye which system is usable in connection with a spectacle test frame as well as in connection with larger refractors. The invention is based upon the use of a combination of spherical and cylindrical liquid lenses, which are continuously variable in power. The focal distance of such lenses may be varied by changing the quantity of a transparent liquid in the lens, the optical surfaces of the lenses being formed by two transparent, elastic diaphragms or by one such diaphragm and one stiff transparent wall.

The invention thus refers to an apparatus, intended for determining the prescription of eye glasses. The apparatus is constructed with two systems of liquid lenses, one system for each eye.

According to the invention, each of the systems of liquid lenses comprises one spherical liquid lens, the dioptric value of which may be varied for determining the spherical refraction properties of the eye, and one cylindrical liquid lens, the dioptric value of which, and the angular position of the axis of which, may be varied in order to determine the astigmatic refractive error of the eye, measured in dioptric value and angular direction of the axis of astigmatism.

The manual control devices for the cylindrical and spherical lenses for each eye may be interconnected in a certain way to be described in order to gain full advantage of the continuously variable liquid lens system.

Further details of the present invention will be apparent from the following description in connection with the attached drawings, which show, as an example of the invention, same used in connection with a spectacle test frame. However, it is obvious, that the invention shall not be limited to this specific form of execution, but that all different kinds of modifications may occur within the scope of the invention, for instance in the form that one does not provide the liquid lens system in connection with a spectacle test frame but instead in connection with a refractor.

The advantage of a refraction instrument according to the invention, compared to previously known designs, is that determinations can be made in a more convenient manner for the patient as well as for the operator of the instrument, that the determinations can be made in a shorter time, and that, as a result, more accurate refraction values are likely to be achieved.

In the drawings, FIG. 1 thus shows a front view of a spectacle test frame, comprising an apparatus according to the present invention, whereas

In this connection it should be mentioned that refractors employing only spherical liquid lenses are known. They have, however, never found any practical use. It seems that the reason for this has been, that astigmatism is so common that a refractor must have means measuring cylindrical refractive errors as well as spherical ones.

Figure 1:
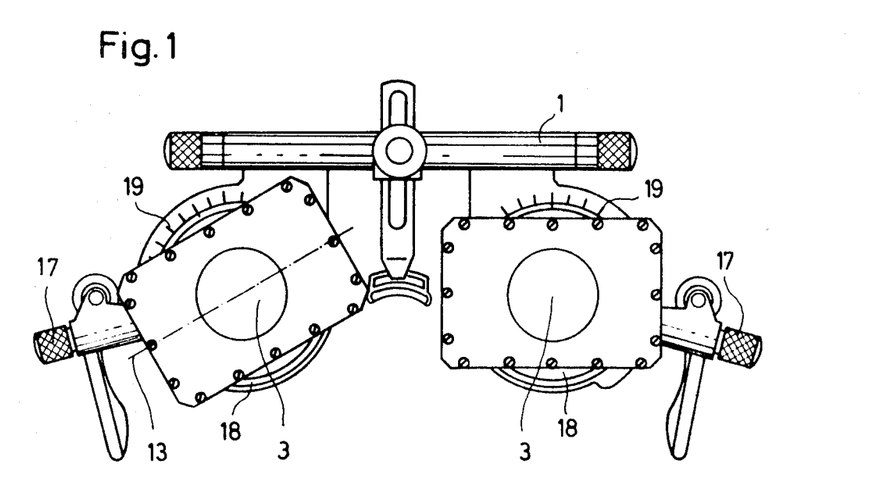
Figure 2:
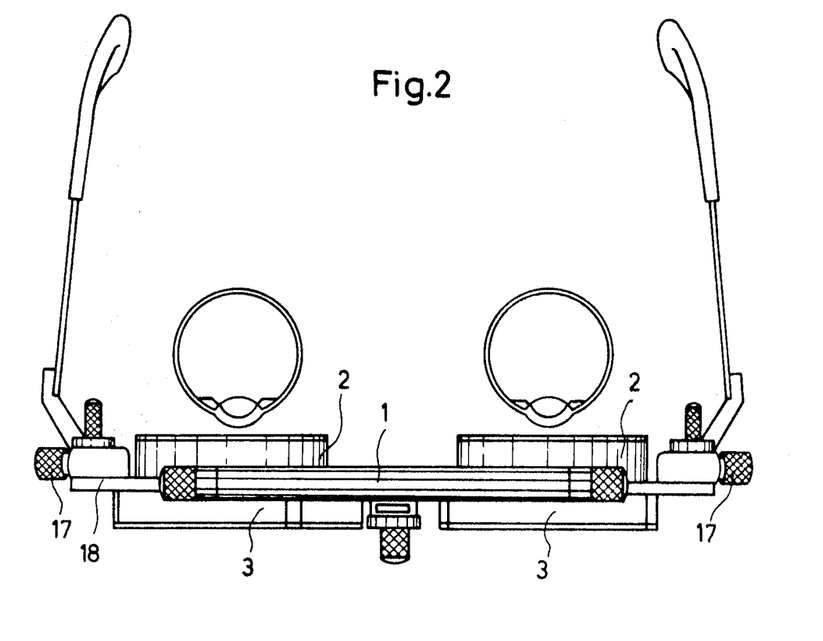
FIG. 2 shows the same spectacle test frame seen from above and with the two eyes of the patient schematically indicated.

In FIGS. 1 and 2, thus, a spectacle test frame is shown. Instead of the usual test glasses, however, two pairs of liquid lenses 2 and 3 have been provided in front of the patient's eye. The distance between the two pairs of lenses is adjustable. The lens 2 is a spherical liquid lens of adjustable focal distance, and the lens 3 is a cylindrical liquid lens, also of adjustable focal distance, and also turnable to vary its axial direction. Certain modification of same will be described later on.

Figure 3:
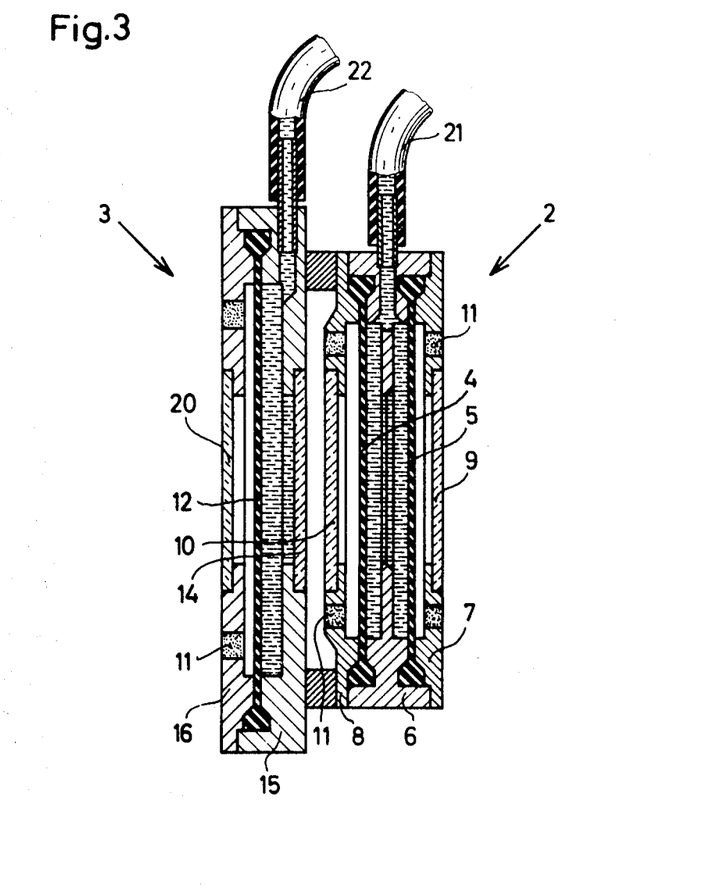
FIG. 3 shows a section through the lens system, which is provided for each eye of the patient.

As seen from FIG. 3, the spherical lens comprises two transparent, elastic diaphragms 4 and 5, the interspace between them being filled with a liquid.

The diaphragms 4 and 5, as well as the diaphragms for the cylinder lenses which will be described below, should be made from a material with good optical as well as mechanical properties. A suitable material is silicone rubber, which characterizes itself in optical respect by high transparency and low surface reflection and in mechanical respect by an appropriate modulus of elasticity, high elongation limit value, and freedom from remanence of form (permanent elastic deformation). Several other transparent materials may also be used.

A spacer ring 6 and two tensioning rings 7 and 8 respectively are provided for retaining the diaphragms in correct position and for sealing the lenses. The spacer ring 6 simultaneously serves as a light diaphragm, to screen off peripheral parts of the liquid lens. This is desirable since liquid lenses—although they, in their central part, have a form which closely approaches the ideal spherical one—in their peripheral parts have a rather large divergence from the ideal.

In order to obtain flat optical surfaces of the diaphragms in their equilibrium positions, corresponding to a zero dioptric value, the diaphragms should be subjected to a prestretching (bias tension). This is achieved by making them with a slightly smaller diameter than the diameter of the seats in the rings 6, 7 and 6, 8 resp. Furthermore, the two diaphragms 4 and 5 have at their outer edges, as well as the corresponding said seats, a cross section which is widened like a wedge, thereby obtaining a radial tension of the diaphragms when they are mounted by squeezing them between the rings 6 and 7, and 6 and 8 resp.

The tensioning rings 7 and 8 carry dust protection glasses 9 and 10 to protect the diaphragms. The space between the diaphragm 5 and the protection glass 9 is in communication with the outer atmosphere by means of dust filters 11 so that air may move out of or into said interspace when the liquid volume of the lens is changed. Corresponding dust filters are also provided in the tensioning ring 8.

The cylinder lens 3 comprises a transparent elastic diaphragm 12, which should preferably be made from the same material as the earlier mentioned diaphragms 4 and 5, and a transparent wall 14. The space between the diaphragm 12 and the wall 14 is filled with a transparent liquid. The diaphragm 12 is also subjected to a prestretching in a manner similar to that for the spherical lens. It is, however, preferable that the diaphragm be subjected to a greater prestretching in a direction perpendicular to the axis 13 of the cylinder in the plane of the membrane than in the direction parallel to said axis. The purpose of this uneven prestretching is to assure that when liquid is pumped into or out of the space between the diaphragm 12 and the wall 14, the diaphragm will expand, or contract, to assume a shape as closely as possible to a true cylinder.

In the arrangement now described, this is not completely possible, but this disadvantage will be further discussed below. In order to obtain the necessary prestretching, the clamped edges are thickened like wedges in a way, which corresponds to what is the case for the spherical diaphragms 4 and 5.

The greater prestretching in the direction perpendicular to the cylinder axis is obtained by making the difference in distance between the edges of the diaphragm 12 and the corresponding distance in the seats of the frames 15 and 16, in a direction perpendicular to the cylinder axis, correspondingly greater than the difference in distance in the direction of the cylinder axis between the edges of said diaphragm and said seats. These directions are measured in the plane of the membranes.

The glass 14, which forms the transparent wall of the space between said glass 14 and the diaphragm 12, is mounted in the frame 15 and this frame 15 is preferably arranged as a light diaphragm in a manner similar to the spacer ring 6 of the lens 2. Thereby the peripheral part of the cylinder lens 3 is screened off. The tensioning frame 16 cooperates with the frame 15. The frame 16 is, in the same way as the tensioning rings 7 and 8, provided with dust filters 11. Finally, a cover glass 20 is provided as a protection for the diaphragm 12.

All of the parts comprising the cylinder lens 3 for each of the two eyes can be rotated in order to find the direction of the axis of the astigmatism. For this purpose a control button 17 is provided, and is connected by means of a gear arrangement, the details of which are not shown in the drawing, to a toothed ring 18, see FIGS. 1 and 2, so that either only the cylinder lens or the cylinder lens and the spherical lens may be rotated. The position of the axis of the cylinder lens may be read against a scale 19.

Figure 4:
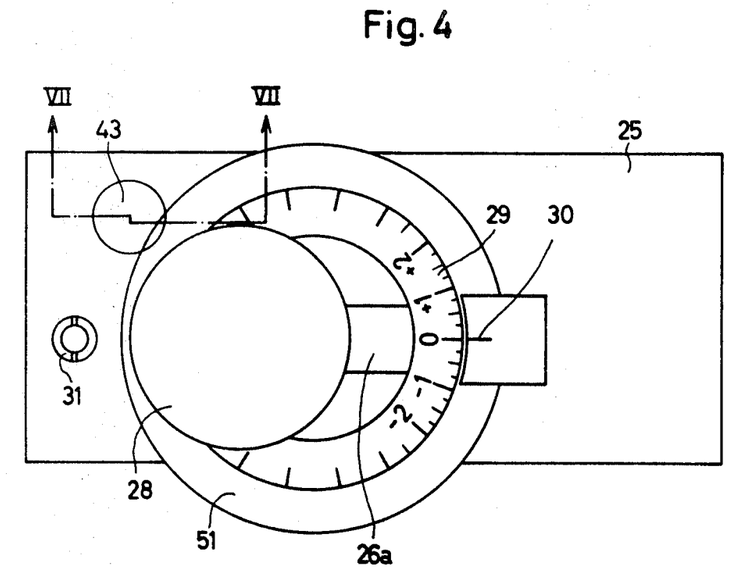
FIG. 4 shows the control device for a liquid lens seen from above.

The instrument is connected to a control unit, by means of which liquid may be fed to each of the two cylinder lenses and to each of the two spherical lenses, respectively. This takes place over conduits 21, 22, which have been shown in FIG. 3 with respect to one of the eyes. The construction of the control unit is more clearly shown in FIGS. 4—6.

As each of the two cylinder lenses and each of the two spherical lenses is controlled by means of essentially similar means, it will be sufficient that one of these means is further described. The liquid is enclosed in a closed system inside of said means, and in this system is included a bellows 23, see FIG. 5. The bellows 23 is in communication with a flexible conduit 21, said conduit leading to the spherical lens 2. The bellows 23 the flexible conduit 21 and the liquid lens 2 thus form together the above-mentioned closed system. The bellows 23 is arranged to be put under pressure from a threaded shaft 24, running through an opening in the instrument panel 25, provided with corresponding interior threads. The threaded shaft 24 is arranged for control from a control button 28 on the shaft of which a gear 27 is mounted. This gear cooperates with an internal gear in a ring 26, which, by means of an arm 26a, is connected to the threaded shaft 24. The ring 26 further is provided with a circular scale 29, calibrated in dioptric units, and which may be read against a fiducial mark 30. For zero adjustment of the bellows arrangement and its scale, a screw 31 is provided in a threaded hole in the panel 25. The screw 31, at its lower end, is pivotally connected to one arm of a lever 32, which is turnable about the joint 41 and carries at its other end a recess comprising a ball 33 in engagement with the bottom plate of the bellows 23. The joint 41 is in the form of a shaft connecting the lever 32 with another lever 36, running at least substantially in parallel thereto, and this lever in turn is pivotally connected to the panel of the control device by means of a bearing member 34 and the shaft 37. The panel 25 also carries a further bearing member 35, but the two bearing members 34 and 35 are made from materials having different temperature expansion coefficients. The bearing member 35, by means of a pin 38, rests against an extension 39 of the lever 36. This extension 39 is made in the form of a slide, which may be displaced in the longitudinal direction of the lever 36 by means of a setscrew 40.

Figure 5:
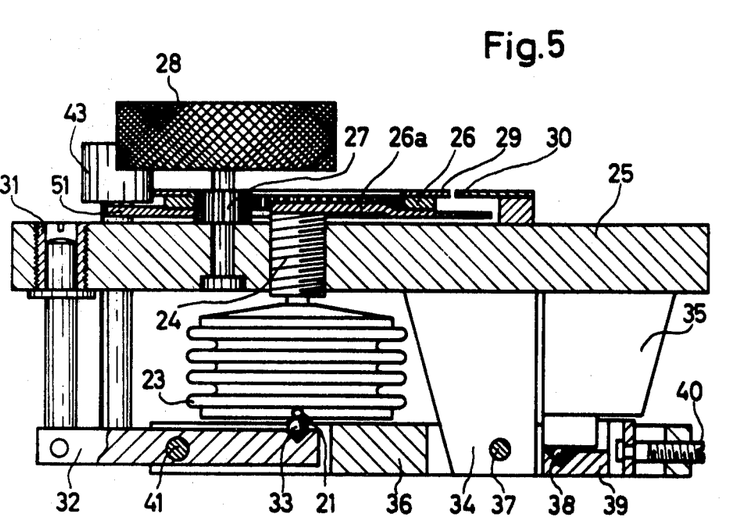
FIG. 5 shows, partially in section, the control device according to FIG. 4
Figure 6:
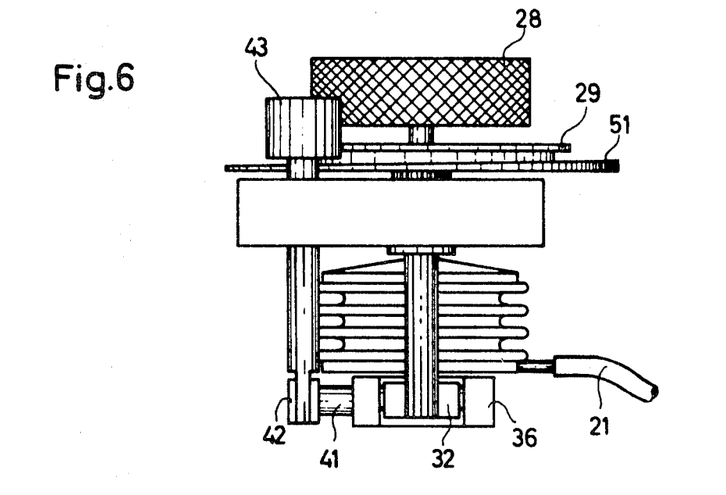
FIG. 6 shows the control device from the end.

This last described arrangement functions in the following manner: It shall first be assumed that the temperature in the room where the instrument is situated is constant, which means that the two bearing members 34 and 35 are at a constant depth below the panel 25. Consequently, the lever 36 will also be in a constant position. It carries the shaft pin 41, and consequently, one may, by means of the screw 31 via the lever 32 and the ball 33, adjust the volume of the bellows so that the lens 2 will have a zero dioptric value when the scale 29 and the fiducial mark 30 so indicate.

When a change in temperature occurs, the two bearing members 34 and 35 will expand to a varying degree since they are made from materials of different thermal expansion coefficients. Thereby a corresponding change will take place in the position of the levers 36 and 32 and under the influence of the shaft pin 41, a change of the volume of the bellows will also occur, and with a correct relation of the different lengths of the two arms 32 and 36. With a correct position of the slide 39, adjusted by means of the screw 40, one may in this way provide for a complete temperature compensation for the expansion of the liquid in the closed system formed by the bellows 23, the conduit 21 and the spherical lens 2. The screw 31 therefore need not be adjusted to compensate for variations in temperature.

When determining the refraction of the eye, it is usual, in order to check the spherical dioptric values obtained, to increase the spherical correction by a given positive amount, usually 0.5 or 1.0 diopters, whereby the visual acuity should be decreased by a given amount. This procedure is often repeated and therefore provisions should be made for an easily performed stepwise change by this amount. This may be done by means of the instrument according to the present invention. For this purpose, the part of the shaft 41 bearing the lever 32 is eccentric in relation to the part of the shaft bearing the lever 36, see FIG. 6. By means of a link 42, see FIG. 7 the shaft 41 is connected to a pressure button 43. Under this pressure button 43 there is situated a disc 51, which may for instance be wedge-shaped.

Figure 7:
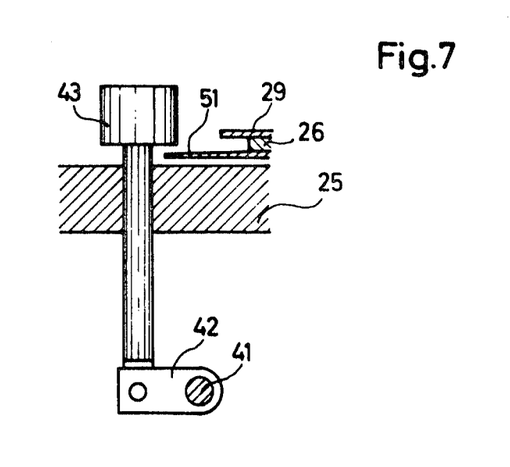
FIG. 7 shows a section along the line VII–VII in FIG. 4

This arrangement functions in the following way: When the button 43 is depressed, the eccentric shaft 41 is turned so that the position of the lever 32 is slightly changed thereby also changing the volume of the bellows as well as the dioptric value of the lens 2. This change should be equal for all of the dioptric values for the lens 2. For instance, it should always amount to 0.5 diopters. For this purpose the wedge-shaped disc 51 is attached to the adjustment device controlled by the button 28, so that the depth of depression of the press button 43 is limited by the disc 51, thereby always obtaining, upon depression of the button 43, a constant change in dioptric values, say 0.5 diopters, of the lens 2 for all settings of the diopter numbers as indicated by the scale 29. A modification of said means for obtaining a constant change in dioptric values will be described below.

The normally used procedure when testing patients with astigmatism for eye glasses is to correct first for the spherical refractive error and thereafter to correct for the astigmatic error. Thereby it often proves that when a given cylindrical correction has been found, it is necessary to change the previously found spherical correction to some extent. Usually, the dioptric value of the spherical lens has to be decreased or increased by a value corresponding approximately to half the dioptric value of the increase or decrease, respectively of the cylinder lens. A rather tedious search therefore will be necessary in order to finally establish the optimum combination of spherical and cylindrical dioptric values.

With the arrangement according to the present invention, this searching may be simplified by introducing a mechanical coupling between the mechanism by means of which the cylinder lens is adjusted, and the mechanism by means of which the spherical lens is adjusted. This coupling, according to the above, should preferably be of such a kind that the dioptric value of the spherical lens is decreased or increased by about half the amount by which the dioptric value of the cylinder lens is increased or decreased respectively. This coupling should only act in a direction from the cylinder lens mechanism to the spherical lens mechanism but not in the reverse direction. Thus, the coupling has to be released automatically when the spherical lens is actuated by means of its knob. Thereafter, however, the coupling is automatically engaged via a reduction gear when actuating the control mechanism of the cylinder lens 3. Simultaneously with the change of the dioptric value of the cylinder lens, therefore, the dioptric value of the spherical lens 2, already adjusted, is changed by a suitable compensating amount so that the optimum values can easily be found.

A disadvantage with the above-described arrangement is derived from the use of cylinder lenses of the type shown. This disadvantage will be further explained below, and it will also be explained how it may be compensated. In order to obtain an enclosed volume the cylinder lens must be clamped at its short sides as well as at its long sides. When increasing or decreasing the liquid volume in the cylinder lens so that its diaphragm 12 is bent outwardly or inwardly, it is, of course, desired that the cylinder lens should assume an exactly cylindrical shape. This, however, is not possible in the design shown because the clamping at the short sides causes a slight bending of the diaphragm around an axis perpendicular to the axis of the cylinder lens. A diaphragm bent in this way in two different levels gives a lens, which may be regarded as composed of a real, ideally formed cylinder lens and a spherical lens. This spherical lens component will thus add its dioptric value to the dioptric value of the already existing spherical lens 2. Often, the spherical component of the cylinder lens is so small that it can be neglected. If great accuracy is desired, however, the disadvantage is that one will have, when measuring the spherical component of the eye refraction, to add to the value, read on the scale of the spherical lens, a correction term corresponding to the spherical component of the cylindrical lens.

This, however, may be avoided if a further coupling is provided between the unit controlling the function of the cylindrical lens and the unit controlling the function of the spherical lens so that, for instance, a displacement of the fiducial mark 30 on the panel 25 will take place for compensation of the added amount of spherical dioptric value obtained when adjusting the cylinder lens 3. This coupling should be of such character, that the dioptric value read indicates the sum of the dioptric value of the spherical lens and that of the spherical component of the cylinder lens. A certain modification of said compensating mechanism will be described below.

In the control units described above in connection with FIGS. 1—7, the dioptric values were read from scales. Of course, one may instead use counters, and the correction arrangements mentioned may also influence their readings as will be described below.

Figure 8:
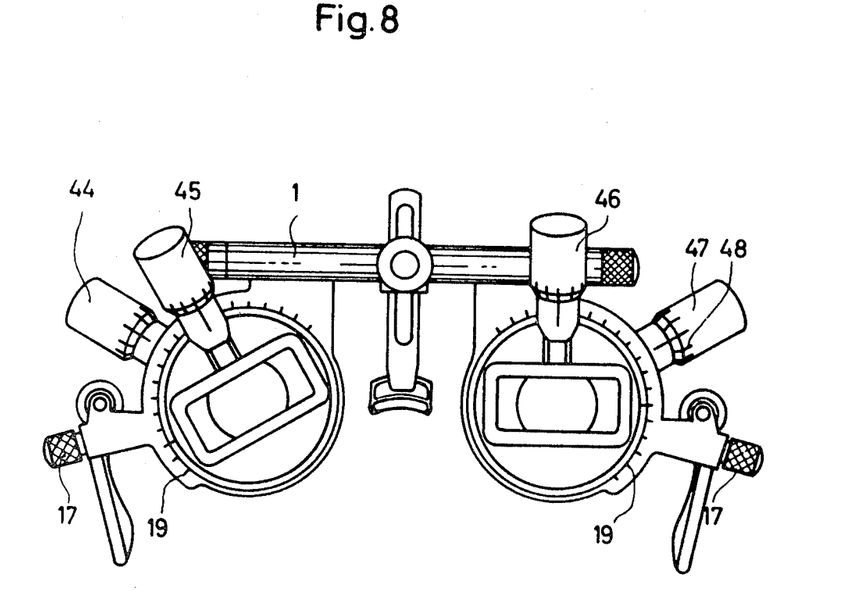
FIG. 8 shows a modification of the arrangement according to FIG. 1.

FIG. 8 shows a modification of the arrangement according to FIGS. 1—7. Also in this case, there is applied in front of each of the patient's eyes an adjustable spherical lens and an adjustable cylindrical lens, both of which are liquid lenses. However, the arrangement is simplified as compared with the above-described arrangement according to FIGS. 1—7 in the respect that each of the four liquid lenses are directly controlled by a pump device 44, 45, 46 and 47, said pump device preferably comprising an outer sleeve provided with threads, in connection with a piston so that the outer sleeve is displaceable by means of its threads against the outer side of the cylinder, whereas the piston is simultaneously displaced in the interior of the cylinder. The outer sleeve may be marked in dioptric units, readable against an index line 48 on the cylinder.

Figure 9:
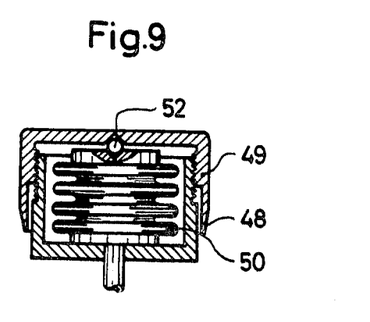
FIG. 9 shows a section through the arrangement, which is used in the refraction measuring apparatus according to FIG. 8, for adjustment of the dioptric value of the lens.

FIG. 9 shows a section through a pump device of the type indicated by 44—47 in FIG. 8. In the arrangement according to FIG. 9, the piston has been replaced by a bellows 50, the upper plate of which has a well in which a ball 52 rests. The ball also rests in a corresponding well on the inner side of the outer sleeve 49, which is connected by threads to the cover containing the bellows 50.

Figure 10:
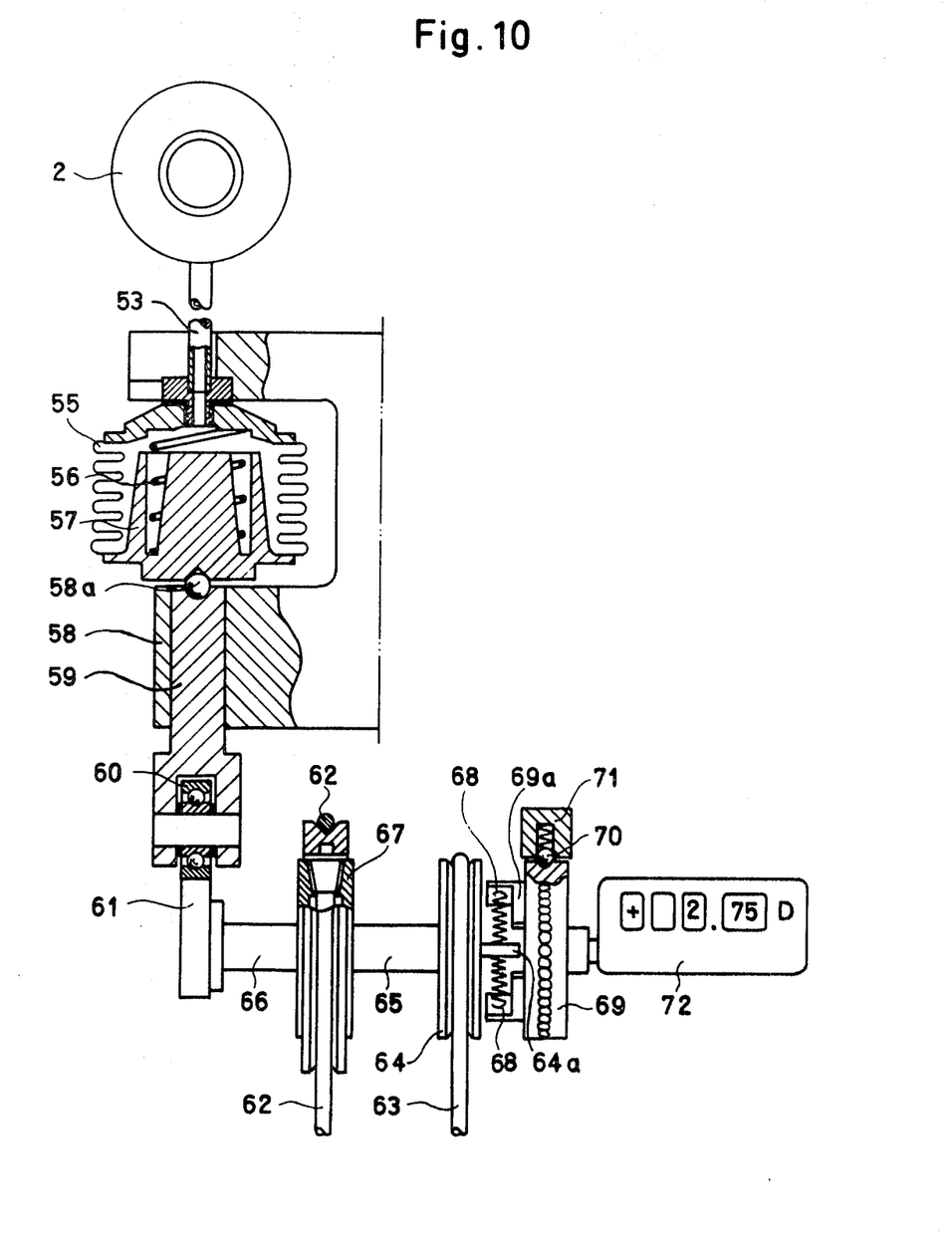
FIG. 10 shows partially in section the control unit of a modification of the invention when executed as a refractor.

FIG. 10 shows certain parts of one of the control units of a modification of the invention when executed as a refractor. The lens 2, conduit 53 and the bellows 55 here form one unit. To obtain stability in the dioptric power of the lens 2 it is advantageous to make the conduit 53 as short as possible, and to actuate the volume changes of the bellows 55 by remote control. This is done by a wire 63 from a control button not shown in FIG. 10. Said wire drives the pulley 64, the axis 65 of which is coupled to a differential gear 67. On the output axis of said gear is attached a cam 61, which moves the shaft 59 by means of the ball bearing 60. The movement of said shaft is transferred to the bellows 55. The shape of the cam 61 is such that the change in dioptric value of the lens becomes a linear function of the rotation of the shafts 66 and 65. Thus, it is possible to transfer the movement of the shaft 65, by means of a mechanism comprising parts 68, 69 and 70 to be described below, to a counter 72 indicating the dioptric value setting of the lens 2.

The mechanism comprising parts 68, 69 and 70 makes it easy to add or subtract a constant dioptric value, say 0.5 diopters of the lens 2, when checking the dioptric values obtained in a manner described above with reference to FIGS. 5, 6 and 7. The control button actuating the wire 63 is turned with a moderate force until the movement is stopped by the wing 64a, on the pulley 64, touching the stop 69a on the cylinder drum 69. The restricted motion is thus transferred to the bellows 55, resulting in a change of dioptric value of +0.5 diopters, when turning the control button one way, say clockwise, and −0.5 diopters, when turned counterclockwise. When the control button is released the springs 68 will restore the pulley 64 to its intermediate position, thus also the lens to the dioptric value as indicated by the counter 72. To change the basic setting of the dioptric value, one merely turns the control button with a slightly larger torque, which then is sufficient to turn also the cylinder drum 69, the rotation of which is braked by the spring-loaded ball 70 in a dimple of the drum 69. The strength of the spring 71 and the depth of the dimples in the drum 69 is chosen in relation to the strength of the springs 68 so that the drum does not turn until the wing 64a touches the stop 69a. The distance between the dimples in the drum 69 is chosen so that the drum can only be set in positions corresponding to certain fractions of one diopter unit. For instance each dimple corresponds to 0.25 diopter.

The compensation for the spherical component of the cylinder lens is accomplished by means of the differential gear 67. The wire 62 is coupled to the control button of the cylinder lens via a gear, not shown in FIG. 10, with an appropriate reduction ratio, so that the axis 66 and the cam 61 turn to such an extent that the dioptric power of the lens 2 is reduced by an amount corresponding to the spherical component of the cylinder lens. During this procedure the axis 65 does not turn, and thus, the counter 72 will show the sum of the dioptric value of the spherical lens 2, and the spherical component of the cylinder lens.

It is important to avoid any backlash between the cam 61, the ball bearing 60 and the bellows 55, since it would introduce an error in the dioptric value of the lens 2, in comparison to the value read on the counter 72. Therefore, to eliminate backlash a spring 56 is mounted inside the bellows 55.

Figure 11:
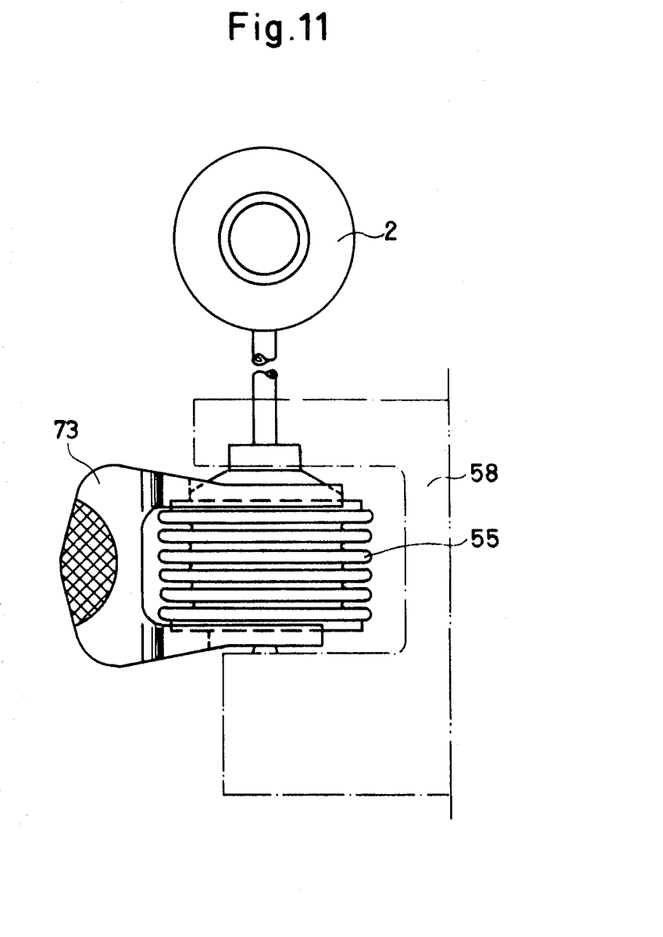
FIG. 11 shows a side view of a fork to facilitate mounting and transportation of an assembled lens, conduit and bellows arrangement.

If unrestrained, the spring 56 would expand the bellows 55 to an extent that would damage the diaphragms of the lens 2 as well as the bellows itself. Therefore the bellows must be clamped when not mounted in position in the frame 58. This is accomplished by a fork 73, see FIG. 11, said fork being always attached to the bellows 55 when not mounted in its proper position in the frame 58 of the refractor unit. Said fork is shaped in such a way that it does not interfere with the frame 58 or any other part of the refractor during the mounting procedure—the bellows being able to be placed in position merely by setting the control unit to its most negative diopter setting, thereby obtaining sufficient space between the ball 58a and the upper part of the frame 58. When setting of the control unit is changed towards positive dioptric values, the bellows will be clamped between the ball 58a and the upper part of the frame 58, and the fork 73 can be removed.

The temperature sensitivity of a liquid lens system can be kept low by designing the system with a small liquid volume. In FIG. 10 it is thus shown how the liquid volume inside the bellows has been reduced by inclusion of a body 57, which is made of a material with low thermal expansion coefficient. Said body should be made as large as possible to replace a large amount of liquid. Said body also forms one of the end plates of the bellows.

It is essential that the liquid in the lens system does not contain any air bubbles. The air may be removed from the liquid system by applying vacuum to the system during the filling procedure. The air will expand which facilitates the air bubbles to raise to the liquid surface. In spite of this, small air bubbles might be trapped inside the bellows. Therefore, it is advantageous to centrifuge, instead, the bellows around its axis. When the whole assembly is rotated, the air will move towards the axis of rotation and it will thereafter move upwards when the speed of rotation is decreased. The proper amount of additional liquid needed to fill the bellows is provided by a syringe. To make possible for the air to escape, it is essential that any surfaces inside the bellows, towards which the air bubbles might move, are properly shaped. Therefore, all peripheral surfaces of the body 57 are cone shaped, as shown in FIG. 10.

In practice, it has proved, that it may be rather difficult to mount the diaphragm 12 into the frame constituted by parts 15 and 16, see FIG. 3. Thus, it may happen, that the thickened edge of the diaphragm 12 may not slide ideally into position but remain positioned somewhat sidewardly, so that the membrane obtains a slightly different tension in different directions. This may cause the axis of the cylinder lens to skew in a nonregular way during operation, particularly for low dioptric values.

Figure 12:
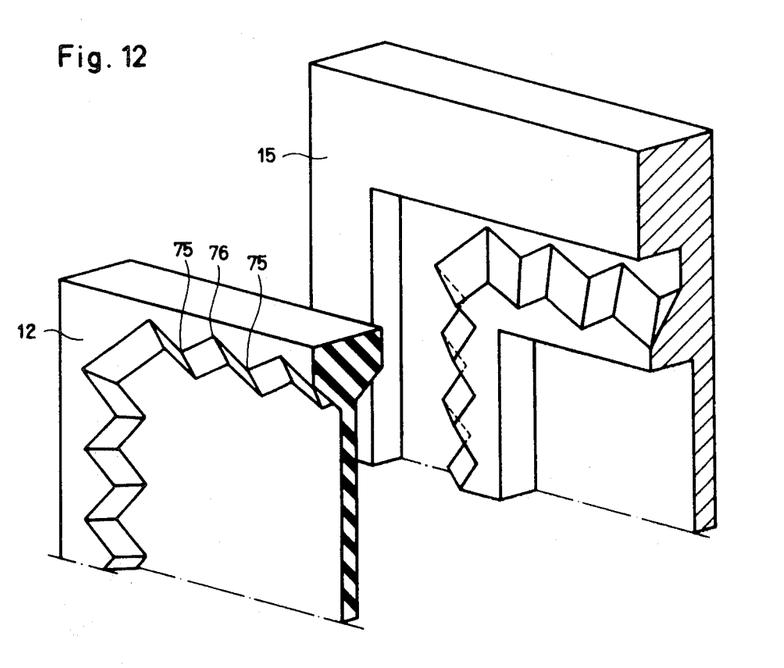
FIG. 12, finally, shows in enlarged scale an exploded view of a part of the arrangement according to FIG. 3.

FIG. 12 shows an arrangement for avoiding the above disadvantage. The FIG. shows in exploded view, the upper left part of FIG. 3 in an enlarged scale. To force the diaphragm to slide into exact positions when mounted, the edge of the diaphragm is given an irregular contour and the opening in the frame is given the complementary contour. Thus, a system of extensions and grooves is arranged in the sloped sides of the thickened part of the diaphragm and in the correspondingly sloped parts of the frames 15 and 16. In FIG. 12 some of these extensions have been shown at 75, and a corresponding groove has been shown at 76.

Such extensions and grooves may also be provided for in the clamping means for the two diaphragms 4 and 5 of the spherical lens. To facilitate for the diaphragm to slide into position when mounted it is desirable to coat the inside of the clamping means with a substance having a low friction coefficient such as Teflon.

We claim:

1. An apparatus for determining the refraction of the human eye, including a frame means in which is mounted a liquid lens system including means for concurrently determining both the spherical and astigmatic refractive errors of the eye, as well as the direction of the astigmatic axis, said means comprising,
   a. a first means for determining the spherical refractive error of the eye, which first means includes a spherical liquid lens and means for varying the dioptric value of said spherical liquid lens to determine the said spherical refractive error and,
   b. a second means for determining both the astigmatic refractive error of the eye and the direction of the astigmatic axis, said second means comprising a cylindrical liquid lens, and means for varying both the dioptric value of the said cylindrical liquid lens and the direction of the axis of the cylindrical surface of the cylindrical liquid lens, said cylindrical and spherical lenses being mounted with their focal centers in alignment with each other for all axial directions of the cylindrical axis, such that all of said astigmatic and spherical refractive errors can be determined concurrently.

2. An apparatus according to claim 1 including a pump means for introducing liquid into and removing liquid from each lens, respectively, and including a means connected to each said pump means for reading dioptric values.

3. An apparatus according to claim 1 in which each of the said lenses comprises at least one transparent elastic diaphragm enclosing said liquid.

4. An apparatus according to claim 3 in which the spherical lens includes two transparent elastic diaphragms between which the liquid is enclosed.

5. An apparatus according to claim 1, each of said liquid lenses including at least one transparent elastic diaphragm and at least a part of the edge of each diaphragm being provided with wedge-formed edge parts for cooperation with grooves in the frame means in which the liquid lens is mounted, and the diaphragms being under dimensioned in their untensioned state in relation to said grooves, such that the diaphragms will be subjected to a given prestretching due to wedge action between the wedges and the grooves when mounted.

6. An apparatus according to claim 5 in which the cylindrical lens is subject to a different prestretching in its longitudinal direction than in the direction perpendicular thereto.

7. An apparatus according to claim 6 in which the prestretching of the cylindrical lens diaphragm is stronger perpendicularly to the axis of the lens than in the direction of said axis.

8. An apparatus according to claim 5 in which protection glasses are provided at least on the side of each of the liquid lenses facing away from the other liquid lens.

9. An apparatus according to claim 8 in which the frame means includes cooperating tension frames for clamping the diaphragms, and wherein the protection glasses are mounted in the said tensioning frames.

10. An apparatus according to claim 8 including a dust filter mounted adjacent the protection glasses to prevent dust from entering the space between each protection glass and its respective diaphragm.

11. An apparatus according to claim 2 in which said pump means comprises a compressible bellows.

12. An apparatus according to claim 11 including a means for manually compressing the bellows, and wherein the last said means are connected to a relatively moving scale and fiducial mark.

13. An apparatus according to claim 11 including a means for manually compressing the bellows, which means is connected to a counter which counts the dioptric value in relation to the compression of the bellows.

14. An apparatus according to claim 11 including a means for compensating for the nonlinearity of the relation between the liquid volume in the liquid lens and the dioptric value of the liquid lens, in order to obtain a linear relation therebetween.

15. An apparatus according to claim 11 in which the bellows is provided with a spring urging the bellows to its expanded position to reduce backlash therein.

16. An apparatus according to claim 11 including a fork device arranged to hold the bellows in a contracted position when it is not mounted for use in its said frame.

17. An apparatus according to claim 16 in which the fork is shaped to permit the bellows to be inserted in or removed from its frame while still clamped by the fork device.

18. An apparatus according to claim 1 including a reading device for recording variations in the dioptric value of the spherical lens, and including a coupling means for transferring movement, when varying the dioptric value of the cylindrical lens, to said reading device of the spherical lens so that the said reading device will correspond to the sum of the dioptric value of the spherical lens and that of the spherical component of the cylindrical lens.

19. An apparatus according to claim 1 including a control device for controlling the dioptric value of the spherical lens, and a counter for showing the said dioptric value, and including a coupling means for transferring movements, when varying the dioptric value of the cylindrical lens, to the said control device of the spherical lens so that the dioptric value of the spherical lens is reduced by an amount corresponding to the dioptric value of the spherical component of the cylindrical lens, the counter thus showing the sum of the dioptric value of the spherical lens and that of the spherical component of the cylindrical lens.

20. An apparatus according to claim 19 including a second coupling means for transferring movement of the cylindrical lens to the control device of the spherical lens, so that when increasing or decreasing the dioptric value of the cylindrical lens, the dioptric value of the spherical lens decreases or increases, respectively.

21. An apparatus according to claim 20 in which said second coupling is unidirectional such that movement of the cylindrical lens actuates the setting of the spherical lens but a movement of the spherical lens does not affect the setting of the cylindrical lens.

22. An apparatus according to claim 20 including a reduction gear in the transfer line running through said coupling, said reduction gear having such a reduction ratio that when changing the dioptric value of the cylindrical lens, the dioptric value of the spherical lens will change by half said dioptric value.

23. An apparatus according to claim 1 including a means for changing the volume of the bellows in order to compensate for temperature changes of the system.

24. An apparatus according to claim 23 in which the temperature compensating means comprises two bearing members having mutually different temperature expansion coefficients, said bearing members being pivotally connected to different points of a lever, which lever is in turn arranged to influence the bellows.

25. An apparatus according to claim 24 in which the lever in connection with the two bearing members comprises a slide, which in turn carries a ball or the like for contact with one of the bearing members, said slide being adjustable for vernier adjustment in order to adjust the temperature compensation factor of the arrangement.

26. An apparatus according to claim 11 in which the bellows has a body in its interior in order to reduce the amount of liquid in the bellows.

27. An apparatus according to claim 26 in which the body is of a material with lower thermal expansion coefficient than the material of the bellows itself.

28. An apparatus according to claim 11 including a pushbutton operated control unit for effecting stepwise change of the dioptric value of the liquid lens by influencing the bellows for increasing or decreasing its volume, respectively, by a given amount.

29. An apparatus according to claim 28 including a disc arranged to be contacted by the pushbutton and wherein movement of the pushbutton is restricted when its lower end comes in contact with the disc, said disc being operatively associated with the pump means for variation of the dioptric value of the liquid lens, said disc being so shaped that when the pushbutton is depressed to contact said disc, the dioptric value of the lens will always change by a given amount.

30. An apparatus according to claim 11 including a control button operated control unit for effecting a stepwise change in the dioptric value of the lens by applying a moderate torque to the control button of the control unit, whereby the dioptric value changes by a given amount from the initial setting, whereas a larger torque changes the initial setting of the dioptric value.

31. An apparatus according to claim 11 including a control unit for effecting by 0.5 dioptric unit or a multiple thereof a stepwise change of the dioptric value of the lens.

32. An apparatus according to claim 3 in which the diaphragms are made from silicone rubber.

33. An apparatus according to claim 3 in which the edges of the diaphragms have an irregular contour, and the frame means have a complementary irregular contour to receive and hold the diaphragms.